April 3, 1951  J. A. COZZONE  2,546,979
EDUCATIONAL CONSTRUCTION UNIT
Filed March 4, 1947  2 Sheets-Sheet 1
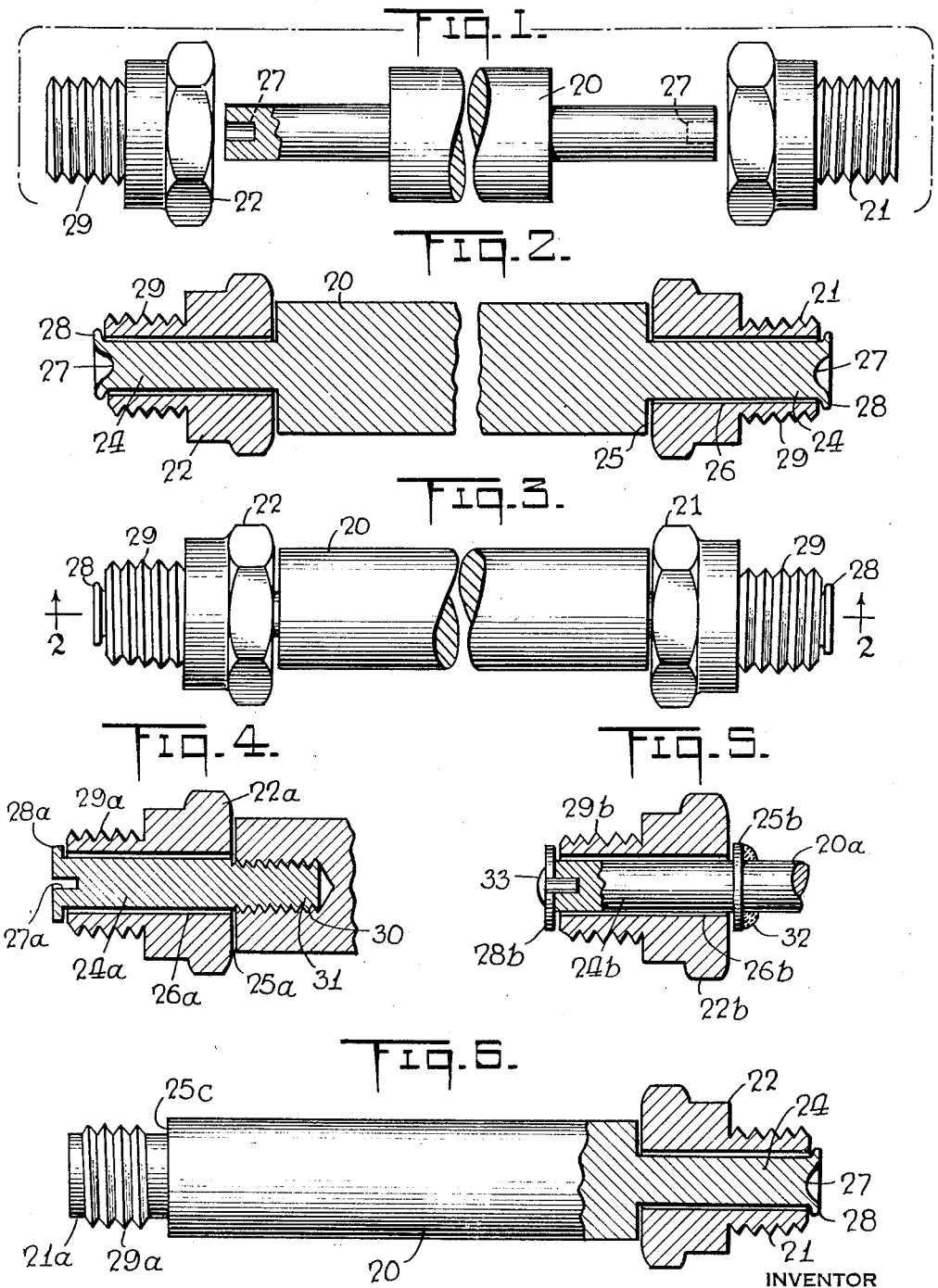
INVENTOR
JOHN A. COZZONE
BY
ATTORNEY April 3, 1951 J. A. COZZONE 2,546,979
EDUCATIONAL CONSTRUCTION UNIT
Filed March 4, 1947 2 Sheets-Sheet 2
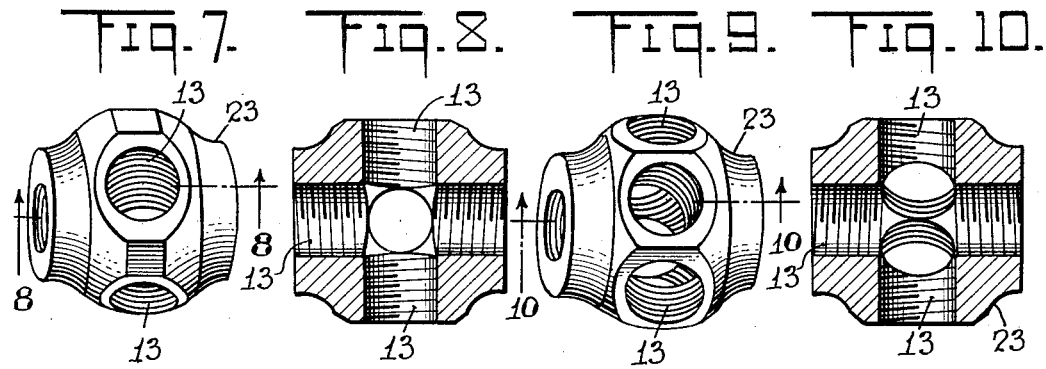
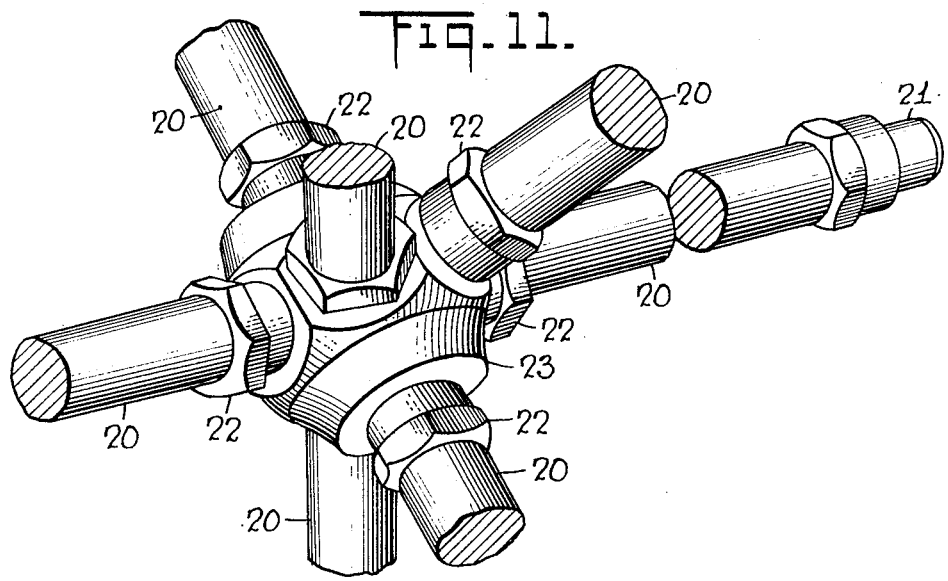
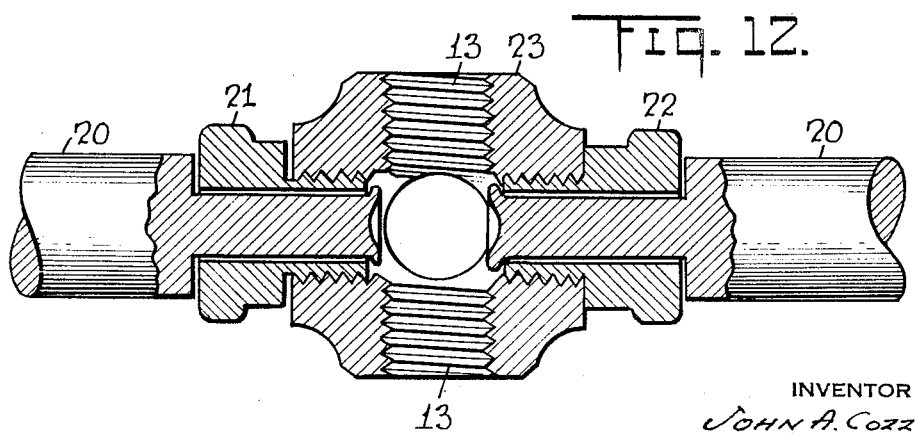
INVENTOR
JOHN A. COZZONE
BY
ATTORNEY Patented Apr. 3, 1951

2,546,979

UNITED STATES PATENT OFFICE 2,546,979

EDUCATIONAL CONSTRUCTION UNIT

John A. Cozzone, Newark, N. J.

Application March 4, 1947, Serial No. 732,340

2 Claims. (Cl. 287—54)

This invention relates to improvements in educational construction units designed primarily for use by children in the designing, building and construction of objects. The invention, as will appear from the description hereinafter, teaches the child manual dexterity and, by observation, the fundamentals of and steps used in fabricating objects.

Pursuant to the instant invention, an educational construction unit is provided of novel structure adapted for use in a variety of multiple combinations for fabricating an infinite variety of objects in a simple manner, the fabricated objects being attractive and rugged, but at the same time, subject to easy and rapid disassembly when desired.

Embodiments of structures employing my invention are shown in the accompanying drawings and described in detail in the ensuing specification. Such embodiments are merely by way of example; my invention is not limited thereto but includes all other forms which would come within the scope or purview of the appended claims. In the drawings, Fig. 1 is an exploded, elevational view of a construction unit embodying my invention.

Fig. 2 is a cross-sectional view thereof in assembled condition, taken on line 2—2 of Fig. 3, Fig. 3 is a partly broken plan view thereof, Fig. 4 is a fragmentary, sectional view of a modified form of the invention, Fig. 5 is a similar view of another modified form, Fig. 6 is a plan view, partly sectional, of another modified form of the invention, Fig. 7 is a perspective view of a connector head adapted for use in forming a construction unit embodying the invention, Fig. 8 is a cross-sectional view thereof, taken on line 8—8 of Fig. 7, Fig. 9 is a perspective view of another form of connector head embodying the invention, Fig. 10 is a cross-sectional view thereof, taken on line 10—10 of Fig. 9, Fig. 11 is a perspective view, partly fragmentary, of a connector head embodying the invention with a plurality of rod members, fragmentarily shown, connected thereto, and Fig. 12 is a fragmentary, partly sectional, view of a connector head embodying the invention, shown securing together the rods of two construction units embodying the invention.

For the sake of simplicity and clarity in the description hereinafter, parts having similar functions and of generally similar characteristics will be designated by the same reference characters, provided with letter suffixes.

As shown in Fig. 1 of the drawings, rod member 20 embodying the invention, which may be of any suitable length and cross-section, is provided with end cap elements 21, 22 secured to the ends thereof and adapted to engage connector heads 23. Both end cap elements 21 and 22 may be rotatably secured to the rod 20 as shown in Fig. 2, whereby the ends of the rod may be secured to different connectors 23 in a rapid manner by manually rotating the cap elements. As the cap elements are rotatably secured to the rod 20, they will rotate freely independently thereof and without relation to the position of the opposite cap element. In a construction unit wherein both cap elements are rotatably secured to the rod, the rod may also rotate independently of said cap elements. The same effect can be obtained in numerous other applications of the invention. This independent movement of the rod proper with respect to its end caps is deemed to have a substantial educational and entertainment value in addition to being of great utility in building and constructing objects.

In the form shown in Figs. 1–3, the ends 24 of the rod 20 are reduced in cross-section or diameter to define, with the adjacent portions of the rod 20, shoulders 25 from which said reduced ends or pins 24 of the rod project. In assembling the device, the pins 24 are passed through the axial apertures 26 in the cap elements 21, 22, and then the ends of said pins are riveted or rolled over to confine the cap elements 21, 22 on the shouldered ends of the rod. For this purpose, the pin ends 24 of the rod 20 may be initially provided with recessed ends 27 so that after the cap elements are assembled on said pins, the ends of the pins may be readily rolled over to define enlarged heads 28 which will confine the cap elements on the shoulders 25 of the rods. The cap elements may be thus assembled on the rods in initially manufacturing the construction unit.

The cap elements 21 and 22 are, in the form of invention shown in Fig. 1, provided with threaded portions 29 to engage complementarily threaded apertures 13 in the connector heads 23. The latter may have any desired or convenient number of such apertures, two examples being shown in Figs. 7 and 9. The connector elements 13 may likewise be of any desired or convenient outline or configuration and the apertures thereof may be so angularly disposed with respect to each other as is found convenient.

A construction unit pursuant to my invention comprises a rod 20 and a connector head 23. Such construction unit may be built up by adding rods 20 and other construction units thereto in an infinite variety of combinations and aggregations to build an infinite variety of objects, of which an example is given in Fig. 11.

The pin ends 24 of the rods 20 may be formed integrally with the rod, as above described, and shown in Figs. 1, 2 and 3, or may be formed as separate elements as shown in Fig. 4, wherein the pin member 24a is shown provided with a threaded end 31 which is threaded into the threaded recess 30 in the end of the rod 20. The pin 24a passes through the aperture 26a of the cap element 22a and holds the latter adjacent the shoulder 25a defined by the end of the rod 20. The pin 24a may be provided with a slotted end 27a for engagement by a tool, such as a screw driver, for facility of threading the pin into the rod. The slotted end of the pin is preferably in the form of an enlarged head 28a to hold the cap element 22a rotatably on the end of the rod. In this form of the invention, the pin 24a and cap 22a may be furnished as separate elements so that the child may assemble the parts shown in Fig. 4, or they may be initially so assembled in manufacture.

In Fig. 5, there is shown another modified form of the invention, in which the rod member 20a has a ring or washer 25b welded, soldered, or otherwise fixed thereto as at 32 to define a shoulder for the integral pin end 24b of the rod. The end cap 22b is provided with the aperture 26b to receive the pin end 24b of the rod 20a. A head member 28b is secured to the outer end of pin 24b; the head member may be formed in a manner similar to that above described in connection with the head 28 of the pin 24 of Fig. 2, or may be formed separately in the form of a ring or washer riveted or otherwise secured as at 33 onto the pin 24b.

In the form of invention shown in Fig. 6, one end of the rod 20 is provided with a pin 24 and the end cap 22 of the form above described in connection with Fig. 1, while the opposite end of the rod is provided with a cap element 21a integrally formed therewith by reducing the diameter or cross-section of said end of the rod to define the shoulder 25c, said cap end 21a being provided with threads 29a. In this form of invention, the cap 21a and rod 20 will have unitary movement so that this form would not be adapted to certain instances of application for which the form of construction unit shown in Fig. 1 is adapted, namely, applications in which it is desirable that both ends of the rod have independent movement relative to the rod proper.

In Fig. 11, the connector head 23 is shown securing together a plurality of rods 20.

In Figs. 7-12 the connector heads 23 are shown provided with threaded apertures 13 for cooperation with the complementarily threaded caps 21 and 22 of the rods 20. Said connector heads and caps may be provided with other complementary interengaging means for the same purpose, namely, to removably unite them.

The construction units of my invention may be made of metal, plastic or other suitable material and may be colored, as desired. It will be appreciated that the invention lends itself admirably to manufacture and sale in the form of kits of various sizes containing various numbers of rods, connector heads and other parts.

While I have shown in the drawings and described in the above specification, convenient forms of structures embodying my invention, it will be apparent from such disclosure that the invention is capable of numerous modifications, without departing from the spirit and scope thereof, as set forth in the appended claims.

Having thus described my invention, what I claim as new and desire to secure by Letters Patent, is:

1. In a toy construction unit, rods having end portions of reduced diameter forming pins surrounded by shoulders at their inner ends, caps rotatably fitting about said pins and having inner ends abutting the shoulders and outer end portions reduced in diameter and externally threaded to form bolt-like portions, said pins having heads at their outer ends of less diameter than the bolt-like portions overlapping the outer ends of said bolt-like portions and holding the caps in rotatable engagement with the pins, and a connector formed with a central cavity and with threaded bores leading from said cavity, the bolt-like portions of said caps being screwed into the bores of said connector and detachably connecting said rods with the connector, said pins having their heads out of contact with each other and with the adjoining portions of the connector to permit free rotation of the pins in the caps and turning movement of the rods.

2. In a toy construction unit, a rod having an end portion of reduced diameter forming a pin surrounded by a shoulder at its inner end, a cap having a bore rotatably fitting about said pin and its inner end abutting the shoulder and an outer end portion reduced in diameter and externally threaded to form a bolt-like portion, said pin having a head at its outer end of less diameter than the bolt-like portion overlapping the outer end of said bolt-like portion and holding the cap in rotatable engagement with the pin, and a connector formed with a central cavity and with threaded bores leading from said cavity, the bolt-like portion of said cap being screwed into one of the bores of said connector and detachably connecting said rod with the connector, said pin having its head out of contact with other pins which may be threaded into said connector and with the adjoining portions of the connector to permit free rotation of the pin in the cap and turning movement of the rod.

JOHN A. COZZONE.

REFERENCES CITED

The following references are of record in the file of this patent:

UNITED STATES PATENTS

| Number | Name | Date |
|---|---|---|
| 119,323 | Codington | Sept. 26, 1871 |
| 512,948 | Darrah | Jan. 16, 1894 |
| 687,057 | Parker | Nov. 19, 1901 |
| 761,742 | Woodward | June 7, 1904 |
| 1,389,787 | Stanley | Sept. 6, 1921 |
| 1,435,028 | Stewart | Nov. 7, 1922 |
| 2,244,378 | Turner | June 3, 1941 |

FOREIGN PATENTS

| Number | Country | Date |
|---|---|---|
| 540,648 | France | July 13, 1922 |